United States Patent
Chou et al.

(10) Patent No.: US 7,315,750 B2
(45) Date of Patent: Jan. 1, 2008

(54) METHOD AND SYSTEM FOR SELECTING AN ACCESS NETWORK IN A HETEROGENEOUS NETWORK ENVIRONMENT

(75) Inventors: Li-Der Chou, Yonghe (TW); Jui-Ming Chen, Taipei (TW); Ju-Wei Chen, Hsinchu (TW); Jen-Shun Yang, Sinjhuang (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 158 days.

(21) Appl. No.: 11/047,713

(22) Filed: Feb. 2, 2005

(65) Prior Publication Data

US 2006/0030319 A1    Feb. 9, 2006

(30) Foreign Application Priority Data

Aug. 6, 2004    (TW) ............................... 93123631 A

(51) Int. Cl.
*H04Q 7/20*    (2006.01)
(52) U.S. Cl. ............................... 455/552.1; 455/435.2; 455/432.1
(58) Field of Classification Search ............. 455/552.1, 455/432.1, 435.1
See application file for complete search history.

(56) References Cited

U.S. PATENT DOCUMENTS 6,282,577 B1    8/2001  Okanoue et al.
6,965,948 B1*   11/2005 Eneborg et al. ............. 709/250
2004/0218605 A1* 11/2004 Gustafsson et al. ......... 370/395.2
2005/0239497 A1* 10/2005 Bahl et al. ................. 455/552.1

FOREIGN PATENT DOCUMENTS

CN    1469680 A    1/2004
CN    1503592 A    6/2004

OTHER PUBLICATIONS

Ying-Dar Lin et. al.; *Multihop Wireless IEEE 802.11 LANs: A Prorotype Implementation*; 2000; 7 pp; KICS.
M. Yliantilla et. al.; *Handoff Procedure For Heterogeneous Wireless Networks*; 1999; pp. 2783-2787; Global Telecommunications Conference.
Eric-Hsiao-Kuang Wu; *Dynamic Adaptive Routing For Heterogeneous Wireless Network*; 2001; pp. 3608-3612; IEEE.
Eric A. Brewer et. al.; *A Network Architecture For Heterogeneous Mobile Computing*; Oct. 1998; pp. 8-24; IEEE.
Jui-Ming Chen et. al.; *Performance Improvement for GPRS, WLAN Integration using Ad Hoc Networks*; 2004; pp. 432-435; IEEE.

* cited by examiner

Primary Examiner—Rafael Perez-Gutierrez
Assistant Examiner—Kwasi Karikari
(74) Attorney, Agent, or Firm—Bacon & Thomas, PLLC

(57) ABSTRACT

The present invention provides a method and system for selecting an access network in a heterogeneous network environment. The method records user configuration information in a mobile device and applies the mobile device to first collect and record current status information of each access network, then determines a network stability coefficient for each access network based on both the user configuration information and the current status information, and finally selects an access network with a maximum network stability coefficient to thus establish a connection with the access network selected.

23 Claims, 3 Drawing Sheets

METHOD AND SYSTEM FOR SELECTING AN ACCESS NETWORK IN A HETEROGENEOUS NETWORK ENVIRONMENT

BACKGROUND OF THE INVENTION

1. Field of the Invention

The invention relates to a network selecting scheme and, more particularly, to a method and system for selecting an access network in a heterogeneous network environment.

2. Description of Related Art

Since current heterogeneous access networks typically have features respectively, it is a very important target that a mobile user can obtain the best quality of services (QoS) on mobile communications by means of the features. For example, the series of wireless local area network (WLAN) IEEE 802.11 generally has a high transmission rate but a very small covered area. By contrast, other networks like General Packet Radio Service (GPRS) and Universal Mobile Telecommunication (UMTS) have a low transmission rate but a wide covered area. Accordingly, when the mobile user is roaming between the networks with different features, the change of transmission rate is approximately 100 times, which greatly affects the QoS.

U.S. Pat. No. 6,282,577, titled "Mobile Terminal and Method for Controlling Network Connection Thereof", describes a control scheme for detecting an existing network and its connection. Accordingly, a mobile device can automatically determine an ad-hoc network or a trunk network to connect, or alternately set an ad-hoc network to connect. In this patent, network IDs and types are applied to determine a current network to be connected to the mobile device based on a fixed priority sequence. In such a way, the QoS will be ignored and may select a network with poorer QoS.

In addition, the paper "Dynamic Adaptive Routing for Heterogeneous Wireless Network" issued in *Proceedings of IEEE Globecom* 2001, vol. 6, pp. 3608-3612, November 2001, by E. Wu, Y. Huang and J. Chiang, describes the Dynamic Adaptive Routing Protocol (DARP) for finding an optimal routing path in a heterogeneous wireless network, thereby obtaining the desired QoS. However, in such a way, the QoS is achieved by routing, which may spend more time.

SUMMARY OF THE INVENTION

The object of the invention is to provide a method and system for selecting an access network in a heterogeneous network environment, which can determine an optimal access network for a mobile user and/or effectively determine to retain the connection in the current access network or hand off to another access network.

According to a feature of the invention, an access network selecting method is provided, which selects one from multiple access networks in a heterogeneous network environment for a mobile device to accordingly establish a connection. The method includes: a setup step, which records user configuration information in the mobile device; a collecting step, which applies the mobile device to collect and record current status information of each access network; a stability coefficient determining step, which applies the mobile device to determine a network stability coefficient for each access network based on both the user configuration information and the current status information; and an access network selecting step, which applies the mobile device to select an access network with a maximum network stability coefficient to thus establish a connection with the access network selected.

According to another feature of the invention, an access network selective method is provided, which re-selects another from multiple access networks in a heterogeneous network environment for a mobile device, which records user configuration information and has a connection with a first access network, to accordingly establish a new connection. The method includes: a connection stability coefficient determining step, which applies the mobile device to collect and record current status information of the first access network and to determine a first network stability coefficient for the first access network based on both the user configuration information and the current status information; a threshold comparing step, which compares the first network stability coefficient with a first and second threshold, wherein the first threshold is greater than the second threshold; a connection remaining step, which, when the first network stability coefficient is greater than the first threshold, remains in the connection between the mobile device and the first access network and next repeats the connection stability coefficient determining step; a pre-connection setup step, which, when the first network stability coefficient is in-between of the first and second threshold, applies the mobile device to collect and record updated current status information of each of other access networks for determining a network stability coefficient for each of the other access networks based on both the user configuration information and the updated current status information, such that the mobile device selects a second access network with a maximum network stability coefficient from the other access networks to thus establish a pre-connection; and a handoff step, which, when the first network stability coefficient is smaller than the second threshold, ends the connection with the first access network and hands off to the second access network that the pre-connection is established.

According to a further feature of the invention, a system for selecting an access network in a heterogeneous network environment is provided. The system includes multiple access networks and at least one mobile device. The mobile device includes: a network status collector, a user profile, and an access network selector. The network status collector collects and records current status information of each access network. The user profile records user configuration information. The access network selector determines a network stability coefficient for each access network based on both the current status information and the user configuration information and accordingly selects an access network with a maximum network stability coefficient, thereby establishing a connection between the access network selected and the mobile device.

According to another further feature of the invention, a system for selecting an access network in a heterogeneous network environment is provided. The system includes multiple access networks and at least one mobile device having a connection with a first access network among the multiple access networks. The mobile device includes: a network status collector, a user profile, and an access network selector. The network status collector collects and records current status information of the first access network. The user profile records user configuration information. The access network selector determines a first network stability coefficient for the first access network based on both the current status information and the user configuration information, and compares the first network stability coefficient with a first and second threshold: when the first network stability coefficient is in-between of the first and second threshold, the network status collector collects and records updated current status information of each of other access networks such that the access network selector computes respective network stability coefficients for the other access networks based on both the updated current status information and the user configuration information to accordingly select a second access network with a maximum network stability coefficient, thereby further establishing a pre-connection between the mobile device and the second access network; and when the first network stability coefficient is smaller than the second threshold, the mobile device ends the connection with the first access network and hands off to the second access network that the pre-connection is established.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
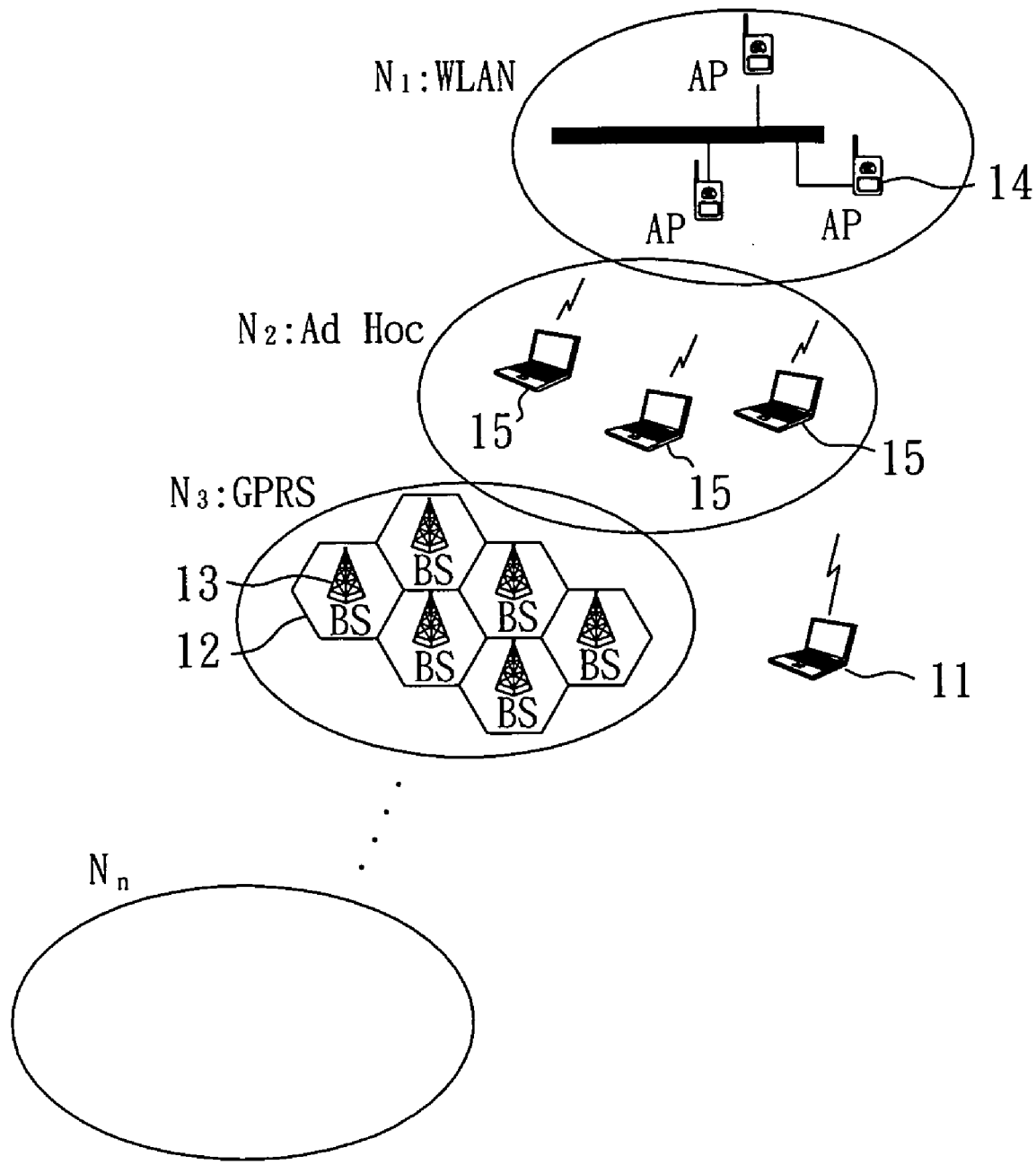
FIG. 1 is a diagram of a network architecture in a heterogeneous network environment according to the invention.

FIG. 1 is a diagram of a network architecture in a heterogeneous network environment according to the invention. As shown in FIG. 1, the heterogeneous network environment can include multiple access networks $N_i$(i=1 to N) such as a WLAN $N_1$, an ad hoc $N_2$, and a GPRS network $N_3$. In the heterogeneous network environment, a mobile device 11 may stay in an area covered by an access point (AP) 14 of the WLAN $N_1$ or in a cell 12 of the GPRS network $N_3$ for accessing network through a base station (BS) 13 of the cell 12, or connects with other mobile device(s) 15 to construct the ad hoc $N_2$ for transferring its packets by way of the mobile device 15.

Figure 2:
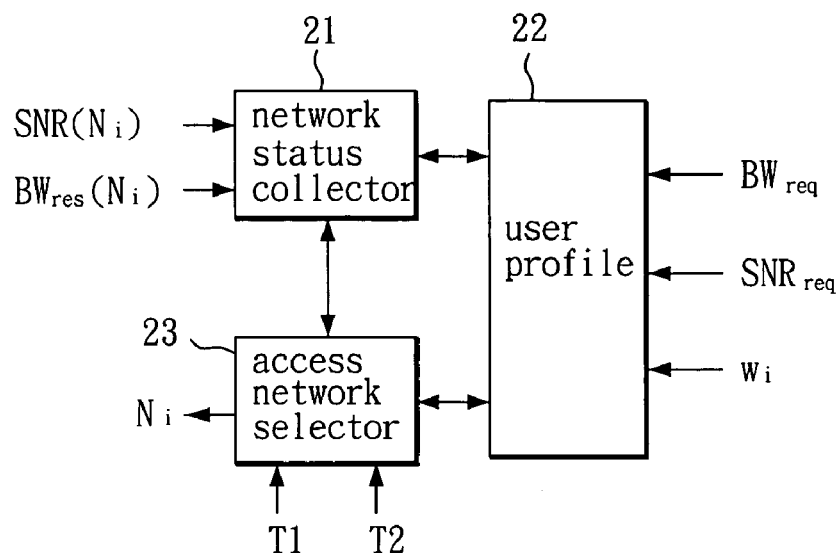
FIG. 2 is a block diagram of a mobile device used in a method and system for selecting an access network in a heterogeneous network environment according to the invention.

For selecting an appropriate access network in the heterogeneous network environment, as shown in FIG. 2, the mobile device 11 includes a network status collector (NSC) 21, a user profile (UP) 22 and an access network selector (ANS) 23. The NSC 21 can detect or collect and record current status information of each access network $N_i$, which includes, for example, signal quality SNR($N_i$) and available bandwidth $BW_{res}(N_i)$.

The UP 22 can record user configuration information including a bandwidth $BW_{req}$ requested by the mobile device or a user, a signal quality SNR($N_i$) required as using each access network $N_i$, and a weight $w_i$ that is set based on user preference for each access network $N_i$.

The ANS 23 selects an access network $N_i$ with an optimal QoS that meets user requirements based on both the current status information of each access network $N_i$ obtained by the NSC 21 and the user configuration information provided by the UP 22.

Figure 3:
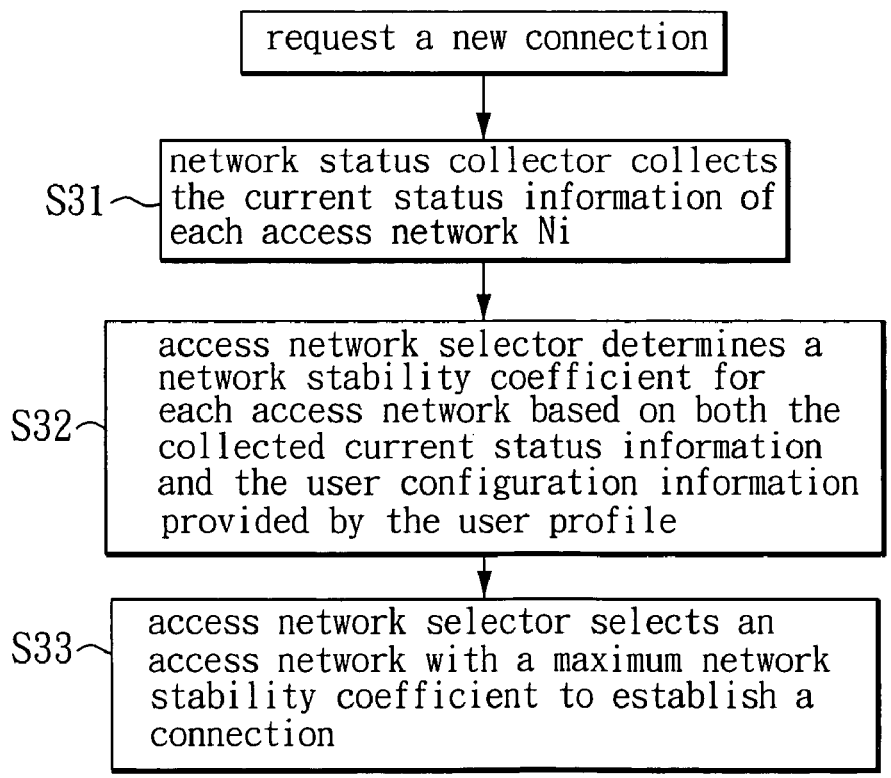
FIG. 3 is a flowchart of using a method to select an access network in a heterogeneous network environment for a connection establishment according to the invention.

FIG. 3 shows a flowchart of using the mobile device 11 to select an access network $N_i$ in a heterogeneous network environment for a connection establishment. As shown in FIG. 3, the NSC 21 of the mobile device 11 collects and records the current status information of each access network $N_i$ by sending a current status request and accordingly receiving a response from each access network $N_i$, wherein the current status information includes, for example, signal quality SNR($N_i$) and available bandwidth $BW_{res}(N_i)$ for each access network $N_i$ (step S31).

In step S32, the ANS 23 of the mobile device 11 determines a network stability coefficient $S(N_i)=w_i*s(N_i)$ for each access network $N_i$ based on both the current status information obtained by the NSC 21 and the user configuration information provided by the UP 22, wherein $N_i$ indicates i-th access network and $s(N_i)$ indicates whether or not the i-th access network meets user requirement that is defined as:

$$s(N_i) = \begin{cases} 0, \text{ if } ((SNR(N_i) < SNR_{req}(N_i)) \vee (BW_{res}(N_i) < BW_{req})) \\ 1, \text{ otherwise} \end{cases},$$

where $w_i$ is a weight of $N_i$ that is set based on user preference for the i-th access network. For example, consideration of price precedence, a cheaper access network has a higher weight, while for consideration of network capability only, $w_i$ can be set to one.

In step S33, the ANS 23 of the mobile device 11 selects an access network $N_m$ with a maximum network stability coefficient $S(N_m)$, i.e., in this case, the maximum network stability coefficient is obtained as i=m, thereby establishing a connection with the access network $N_m$.

However, the mobile device 11, connecting with the access network $N_m$, may cause a change of network connection conditions due to the movement, resulting in a need of re-selecting another access network for a new connection.

Figure 4:
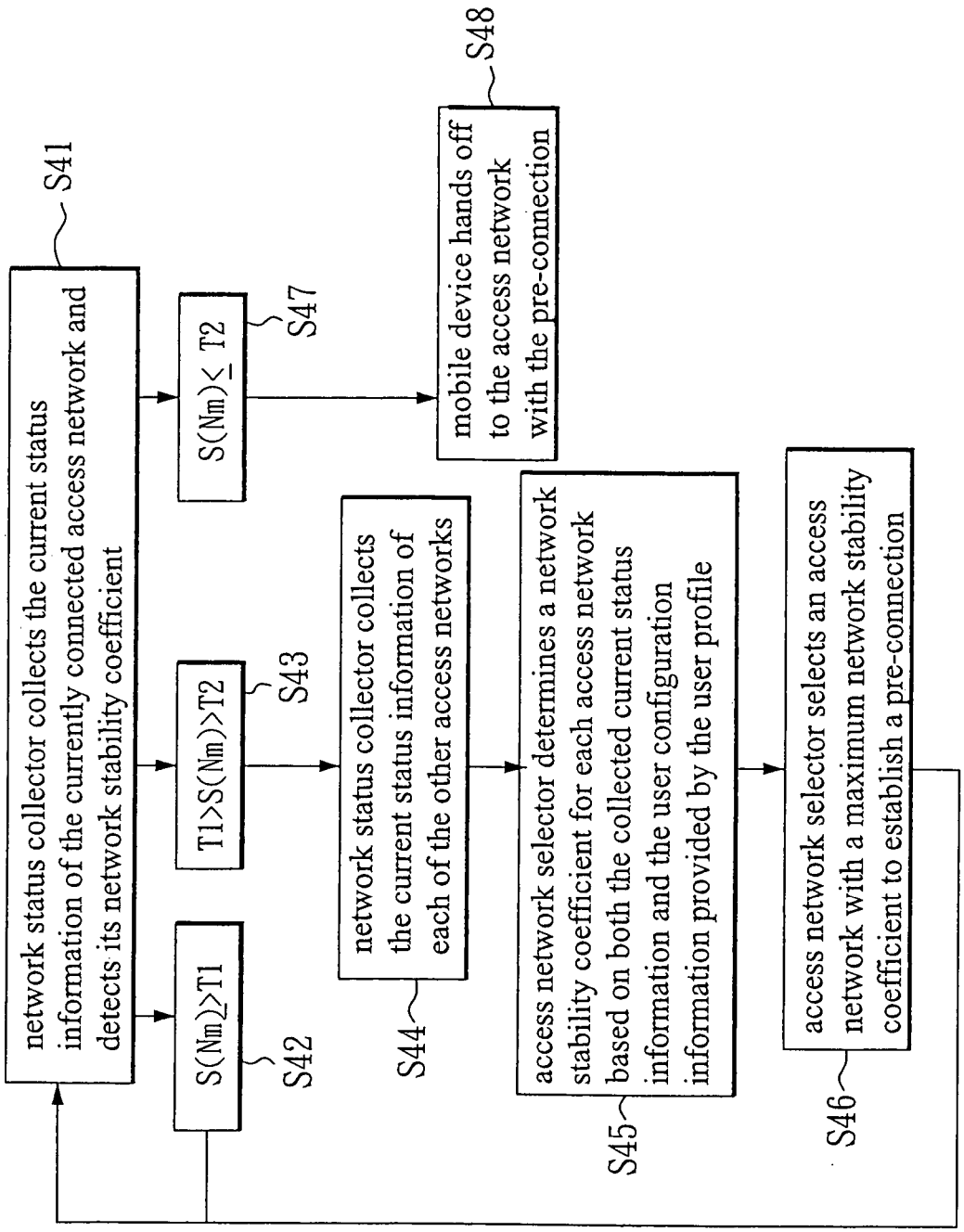
FIG. 4 is a flowchart of using a method to re-select an access network in a heterogeneous network environment for a new connection establishment according to the invention.

Accordingly, FIG. 4 shows a flowchart of using the connected mobile device 11 to re-select an access network in a heterogeneous network environment for a new connection establishment. As shown in FIG. 4, in step S41, the mobile device 11 uses its NSC 21 to repeatedly collect the current status information (including SNR($N_m$) and $BW_{res}(N_m)$) of the access network $N_m$ and uses its ANS 23 to detect a network stability coefficient $S(N_m)$ of the access network $N_m$, as is identical to step S32.

The ANS 23 has a first threshold T1 and a second threshold T2, wherein T1 is greater than T2. Accordingly, the ANS 23 compares the network stability coefficient $S(N_m)$ with the thresholds T1 and T2. When the network stability coefficient $S(N_m)$ is greater than the threshold T1, it indicates that the connection between the mobile device 11 and the access network $N_m$ remains in a steady status. When the network stability coefficient is smaller than the second threshold T2, it indicates that the connection between the mobile device 11 and the access network $N_m$ cannot be retained any more. In this embodiment, T1 is set as the greatest one among all $w_i$ and T2 is set to zero.

Accordingly, when the network stability coefficient $S(N_m)$ is greater than the threshold T1 (step S42), the mobile device 11 remains in the connection with the access network $N_m$, and also collects the current status information of the access network $N_m$ and detects the network stability coefficient $S(N_m)$ of the access network $N_m$ (step S41).

When the network stability coefficient $S(N_m)$ is in-between of the thresholds T1 and T2 (step S43), the mobile device 11 remains in the connection with the access network $N_m$ but further uses the network status collector (NSC) 21 to collect and record current status information of each of the other access networks $N_i$, wherein the current status information includes signal quality $SNR(N_i)$ and available bandwidth $BW_{res}(N_i)$ (step S44). The ANS 23 of the mobile device 11 determines a network stability coefficient $S(N_i)$ for each access network $N_i$ based on both the current status information obtained by the NSC 21 in step S44 and the user configuration information provided by the UP 22 (step S45), as is identical to step S32. Next, the ANS 23 of the mobile device 11 selects an access network $N_m$, with a maximum network stability coefficient $S(N_m,)$, so as to establish a pre-connection between the mobile device and the access network $N_m$, (step S46).

When the network stability coefficient $S(N_m)$ is smaller than the threshold T2 (step S47), the mobile device 11 ends the connection with the access network $N_m$ (step s48) and immediately hands off to the access network $N_m$, that the pre-connection is established. Therefore, a fast handoff is carried out.

In view of the foregoing, it is known that the invented method and system can select an optimal access network to be currently used by a mobile device based on network stability coefficients respectively derived from current status information of each access networks in a heterogeneous network environment and further monitor the change of network stability coefficients for effectively determining to retain the currently used access network in a connection or hand off to another access network.

Although the present invention has been explained in relation to its preferred embodiment, it is to be understood that many other possible modifications and variations can be made without departing from the essence and scope of the invention as hereinafter claimed.

What is claimed is:

1. An access network selecting method, which selects one from multiple access networks in a heterogeneous network environment for a mobile device capable of connecting with different access networks to accordingly establish a connection with a selected access network, the method comprising:
    a setup step, which records user configuration information including a requested bandwidth, a required signal quality for each access network and a weight that is set based on user preference for each access network in the mobile device;
    a collecting step, wherein the mobile device collects and records current status information including a signal quality and an available bandwidth of each access network;
    a stability coefficient determining step, wherein the mobile device determines a network stability coefficient for each access network based on the requested bandwidth, the required signal quality, the weight, the signal quality and the available bandwidth, such that the stability coefficient is zero when the available bandwidth is smaller than the requested bandwidth or the signal quality is smaller than the required signal quality, and otherwise the stability coefficient equals the weight; and
    an access network selecting step, wherein the mobile device selects an access network with a maximum network stability coefficient to thus establish a connection with the access network selected,
    wherein in the stability coefficient determining step, the network stability coefficient is determined as $S(N_i)=w_i*s(N_i)$, where i is an integer from one to a total of access networks in the heterogeneous network environment, $N_i$ indicates i-th access network, $w_i$ indicates the weight of the access network $N_i$, and $s(N_i)$ indicates whether or not the access network $N_i$ meets user requirement that is defined as:

$$s(N_i) = \begin{cases} 0, \text{ if } ((SNR(N_i) < SNR_{req}(N_i)) \vee (BW_{res}(N_i) < BW_{req})) \\ 1, \text{ otherwise} \end{cases},$$

where $SNR(N_i)$ indicates the signal quality of the access network $N_i$, $SNR_{req}(N_i)$ indicates the requested signal quality of the access network $N_i$, $BW_{req}$ indicates the requested bandwidth, and $BW_{res}(N_i)$ indicates the available bandwidth in the access network $N_i$.

2. The method as claimed in claim 1, wherein the weight $w_i$ is set based on a price for the access network $N_i$.

3. The method as claimed in claim 1, wherein the weight $w_i$ is one.

4. An access network selecting method, which re-selects one from multiple access networks in a heterogeneous network environment for a mobile device capable of connecting with different access networks, which records user configuration information including a requested bandwidth, a required signal quality for each access network and a weight that is set based on user preference for each access network and has a connection with a first access network, to accordingly establish a new connection with a re-selected access network, the method comprising:
    a connection stability coefficient determining step, wherein the mobile device collects and records current status information, including a signal quality of the first access network and an available bandwidth in the first access network, of the first access network and to determine a first network stability coefficient for the first access network based on the requested bandwidth, the required signal quality, the weight, the signal quality and the available bandwidth, such that the stability coefficient is zero when the available bandwidth is smaller than the requested bandwidth or the signal quality is smaller than the required signal quality, and otherwise the stability coefficient equals the weight;
    a threshold comparing step, which compares the first network stability coefficient with a first and second threshold, wherein the first threshold is greater than the second threshold;
    a connection remaining step, which, when the first network stability coefficient is greater than the first threshold, remains in the connection between the mobile device and the first access network and next repeats the connection stability coefficient determining step;
    a pre-connection setup step, wherein, when the first network stability coefficient is in-between of the first and second threshold, the mobile device collects and records updated current status information of each of other access networks for determining a network stability coefficient for each of the other access networks based on both the user configuration information and the updated current status information, such that the mobile device selects a second access network with a maximum network stability coefficient from the other access networks to thus establish a pre-connection; and a handoff step, which, when the first network stability coefficient is smaller than the second threshold, ends the connection with the first access network and hands off to the second access network that the pre-connection is established, wherein the first network stability coefficient is determined as $S(N_m)=w_m*s(N_m)$, where m is an integer from one to a total of access networks in the heterogeneous network environment, $N_m$ indicates the first access network, $w_m$ indicates the weight of the first access network, and $s(N_m)$ indicates whether or not the first access network meets user requirement that is defined as:

$$s(N_m) = \begin{cases} 0, \text{ if } ((SNR(N_m) < SNR_{req}(N_i)) \vee (BW_{res}(N_m) < BW_{req})) \\ 1, \text{ otherwise} \end{cases},$$

where $SNR(N_m)$ indicates the signal quality of the first access network $SNR_{req}(N_m)$ indicates the requested signal quality of the first access network, $BW_{req}$ indicates the requested bandwidth, and $BW_{res}(N_m)$ indicates the available bandwidth in the first access network.

5. The method as claimed in claim 4, wherein the first threshold is set as a value equal to a greatest one among all weights, and the second threshold is set to zero.

6. The method as claimed in claim 4, wherein the weight $w_m$ is set based on a price for the first access network.

7. The method as claimed in claim 4, wherein the weight $w_m$ is one.

8. The method as claimed in claim 7, wherein the network stability coefficient, for each of the other access networks, is determined as $S(N_i)=w_i*s(N_i)$, where i is an integer from one to a total of access networks in the heterogeneous network environment, $N_i$ indicates i-th access network, $w_i$ indicates a weight of the access network $N_i$, and $s(N_i)$ indicates whether or not the access network $N_i$ meets user requirement that is defined as:

$$s(N_i) = \begin{cases} 0, \text{ if } ((SNR(N_i) < SNR_{req}(N_i)) \vee (BW_{res}(N_i) < BW_{req})) \\ 1, \text{ otherwise} \end{cases},$$

where $SNR(N_i)$ indicates a signal quality of the access network $N_i$, $SNR_{req}(N_i)$ indicates a requested signal quality of the access network $N_i$, $BW_{req}$ indicates a requested bandwidth, and $BW_{res}(N_i)$ indicates an available bandwidth in the access network $N_i$.

9. The method as claimed in claim 8, wherein the weight $w_i$ is set based on a price for the access network $N_i$.

10. The method as claimed in claim 8, wherein the weight $w_i$ is one.

11. The method as claimed in claim 4, wherein in the pre-connection setup step, the updated current status information includes, for each of the other access networks, a signal quality and an available bandwidth.

12. A system for selecting an access network in a heterogeneous environment, comprising:
multiple access networks; and
at least one mobile device capable of connecting with different access networks, which includes:
a network status collector, to collect and record current status information including, for each access network, a signal quality and an available bandwidth;
a user profile, to record user configuration information including a requested bandwidth, a required signal quality for each access network and a weight that is set based on user preference for each access network; and
an access network selector, to determine a network stability coefficient for each access network based on the requested bandwidth, the required signal quality, the weight, the signal quality and the available bandwidth, such that the stability coefficient is zero when the available bandwidth is smaller than the requested bandwidth or the signal quality is smaller than the required signal quality, and otherwise the stability coefficient equals the weight, and accordingly select an access network with a maximum network stability coefficient, thereby establishing a connection between the access network selected and the mobile device, wherein the access network selector determines the network stability coefficient as $S(N_i)=w_i*s(N_i)$, where i is an integer from one to a total of access networks in the heterogeneous network environment, $N_i$ indicates ith access network, $w_i$ indicates the weight of the access network $N_i$, and $s(N_i)$ indicates whether or not the access network $N_i$ meets with user requirement that is defined as:

$$s(N_i) = \begin{cases} 0, \text{ if } ((SNR(N_i) < SNR_{req}(N_i)) \vee (BW_{res}(N_i) < BW_{req})) \\ 1, \text{ otherwise} \end{cases},$$

where $SNR(N_i)$ indicates the signal quality of the access network $N_i$, $SNR_{req}(N_i)$ indicates the requested signal quality of the access network $N_i$, $BW_{req}$ indicates the requested bandwidth, and $BW_{res}(N_i)$ indicates the available bandwidth in the access network $N_i$.

13. The system as claimed in claim 12, wherein the weight $w_i$ is set based on a price for the access network $N_i$.

14. The system as claimed in claim 12, wherein the weight $w_i$ is one.

15. A system for selecting an access network in a heterogeneous environment, comprising:
multiple access networks; and
at least one mobile device capable of connecting with different access networks, which has a connection with a first access network among the multiple access networks, the mobile device including:
a network status collector, to collect and record current status information including a signal quality of the first access network and an available bandwidth in the first access network;
a user profile, to record user configuration information including a requested bandwidth, a required signal quality for each of the access networks and a weight that is set based on user preference for each of the access networks; and
an access network selector, to determine a first network stability coefficient for the first access network based on the requested bandwidth, the required signal quality, the weight, the signal quality and the available bandwidth, such that the stability coefficient is zero when the available bandwidth is smaller than the requested bandwidth or the signal quality is smaller than the required signal quality, and otherwise the stability coefficient equals the weight, and further compare the first network stability coefficient with a first threshold and a second threshold smaller than the first threshold, wherein when the first network stability coefficient is in-between of the first and second threshold, the network status collector collects and records updated current status information of each of other access networks, such that the access network selector determines a network stability coefficient for each of the other access networks based on both the updated current status information and the user configuration information and accordingly selects a second access network with a maximum network stability coefficient to further establish a pre-connection between the mobile device and the second access network; and when the first network stability coefficient is smaller than the second threshold, the mobile device ends the connection with the first access network and hands off to the second access network that the pre-connection is established, wherein the first network stability coefficient is determined as $S(N_m)=w_m*s(N_m)$, where m is an integer from one to a total of access networks in the heterogeneous network environment, $N_m$ indicates the first access network, $w_m$ indicates the weight of the first access network, and $s(N_m)$ indicates whether or not the first access network meets with user requirement that is defined as:

$$s(N_m) = \begin{cases} 0, \text{ if } ((SNR(N_m) < SNR_{req}(N_i)) \vee (BW_{res}(N_m) < BW_{req})) \\ 1, \text{ otherwise} \end{cases},$$

where $SNR(N_m)$ indicates the signal quality of the first access network, $SNR_{req}(N_m)$ indicates the requested signal quality of the first access network, $BW_{req}$ indicates the requested bandwidth, and $BW_{res}(N_m)$ indicates the available bandwidth in the first access network.

16. The system as claimed in claim 15, wherein when the first network stability coefficient is greater than the first threshold, the mobile device remains in the connection with the first access network.

17. The system as claimed in claim 16, wherein the updated current status information includes, for each of the other access networks, a signal quality and an available bandwidth.

18. The system as claimed in claim 17, wherein the network stability coefficient, for each of the other access networks, is determined as $S(N_i)=w_i*s(N_i)$, where i is an integer from one to a total of access networks in the heterogeneous network environment, $N_i$ indicates i-th access network different from the first access network, $w_i$ indicates a weight of the access network $N_i$, and $s(N_i)$ indicates whether or not the access network $N_i$ meets user requirement that is defined as:

$$s(N_i) = \begin{cases} 0, \text{ if } ((SNR(N_i) < SNR_{req}(N_i)) \vee (BW_{res}(N_i) < BW_{req})) \\ 1, \text{ otherwise} \end{cases},$$

where $SNR(N_i)$ indicates a signal quality of the access network $N_i$, $SNR_{req}(N_i)$ indicates a requested signal quality of the access network $N_i$, $BW_{req}$ indicates a requested bandwidth, and $BW_{res}(N_i)$ indicates an available bandwidth in the access network $N_i$.

19. The system as claimed in claim 18, wherein the weight $w_i$ is set based on a price for the access network $N_i$.

20. The system as claimed in claim 18, wherein the weight $w_i$ is one.

21. The system as claimed in claim 16, wherein the first threshold is set as a value equal to a greatest one among all weights, and the second threshold is set to zero.

22. The system as claimed in claim 15, wherein the weight $w_m$ is set based on a price for the first access network.

23. The system as claimed in claim 15, wherein the weight $w_m$ is one.

* * * * *